No. 814,679.  
PATENTED MAR. 6, 1906.

J. BRENZINGER.  
CAN FLANGING MACHINE.  
APPLICATION FILED FEB. 11, 1903.

6 SHEETS—SHEET 1.

No. 814,639. PATENTED MAR. 6, 1906.
J. BRENZINGER.
CAN FLANGING MACHINE.
APPLICATION FILED FEB. 11, 1903.

6 SHEETS—SHEET 3.

Witnesses
Jos. T. Blackwood
James G. Ogden

Inventor
Julius Brenzinger

By W. H. Doolittle & Son
Attorneys

No. 614,639. PATENTED MAR. 6, 1906.
J. BRENZINGER.
CAN FLANGING MACHINE.
APPLICATION FILED FEB. 11, 1903.
6 SHEETS—SHEET 4.
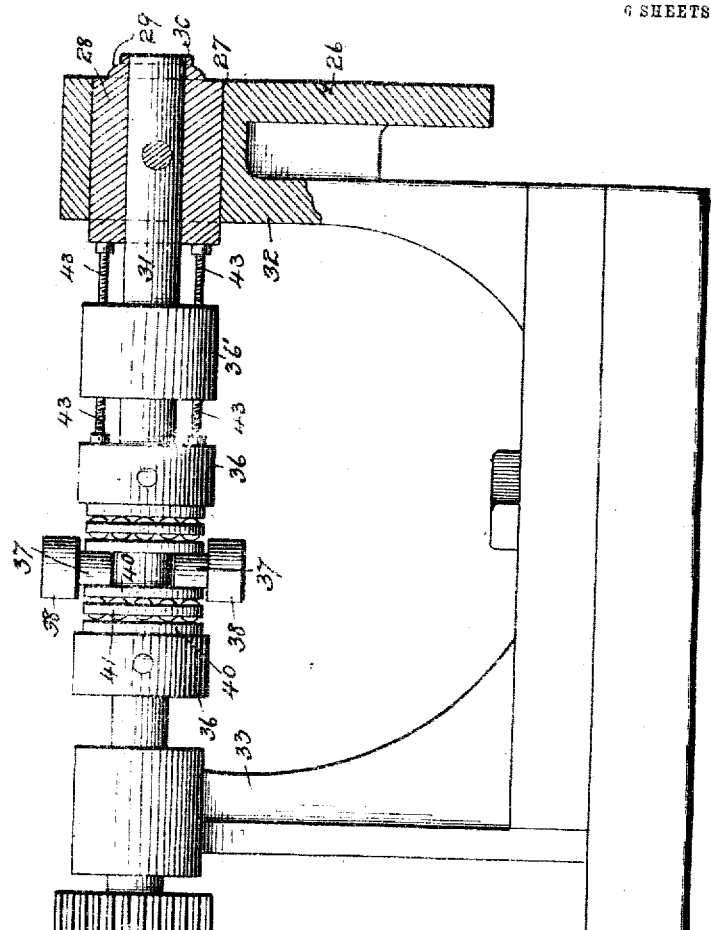
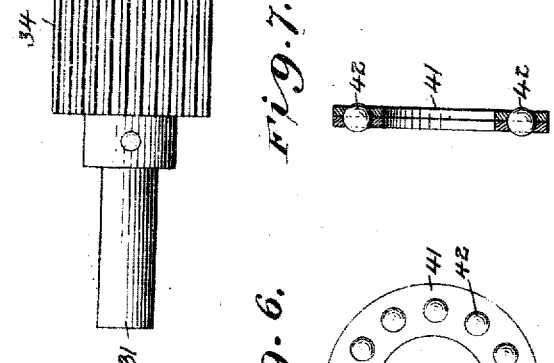
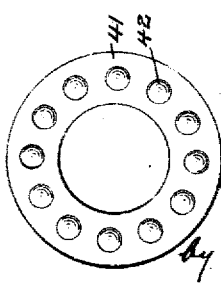

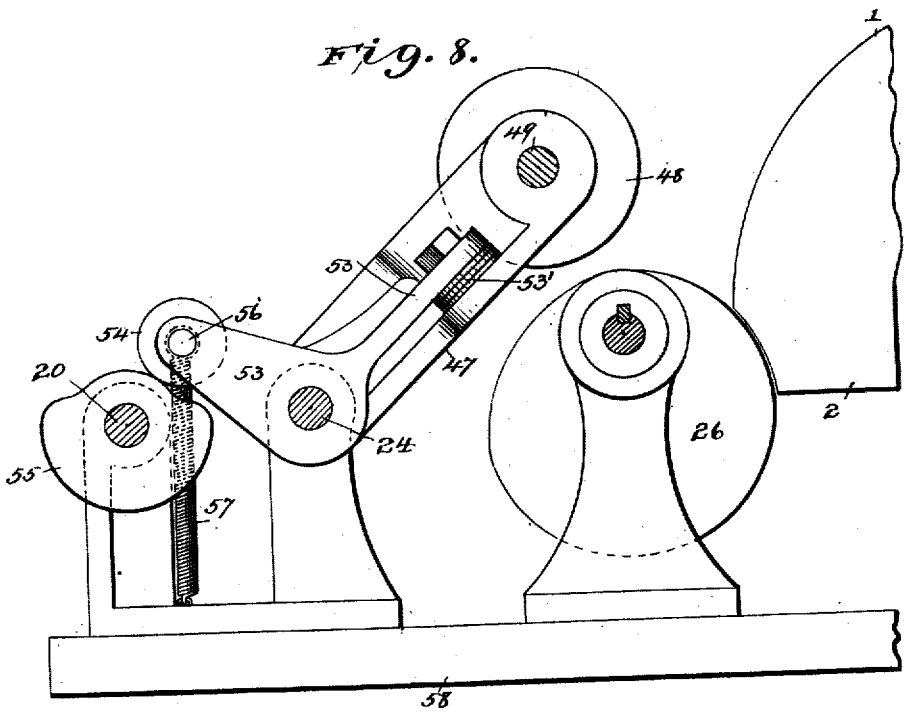
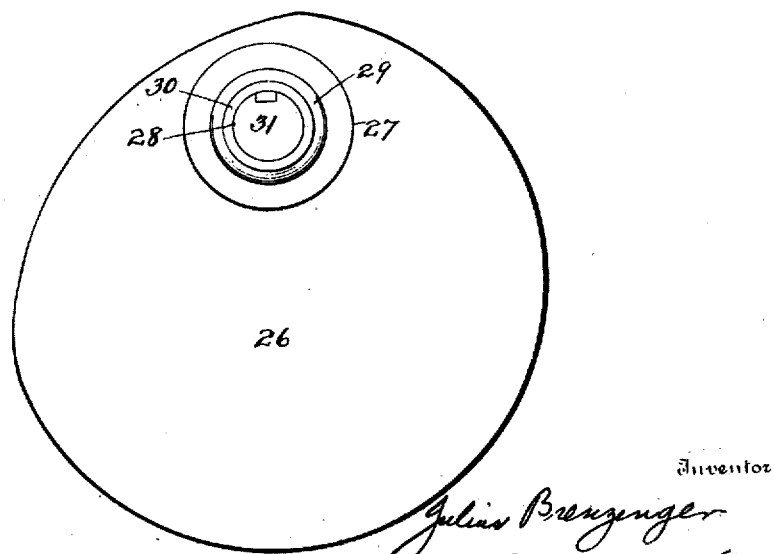

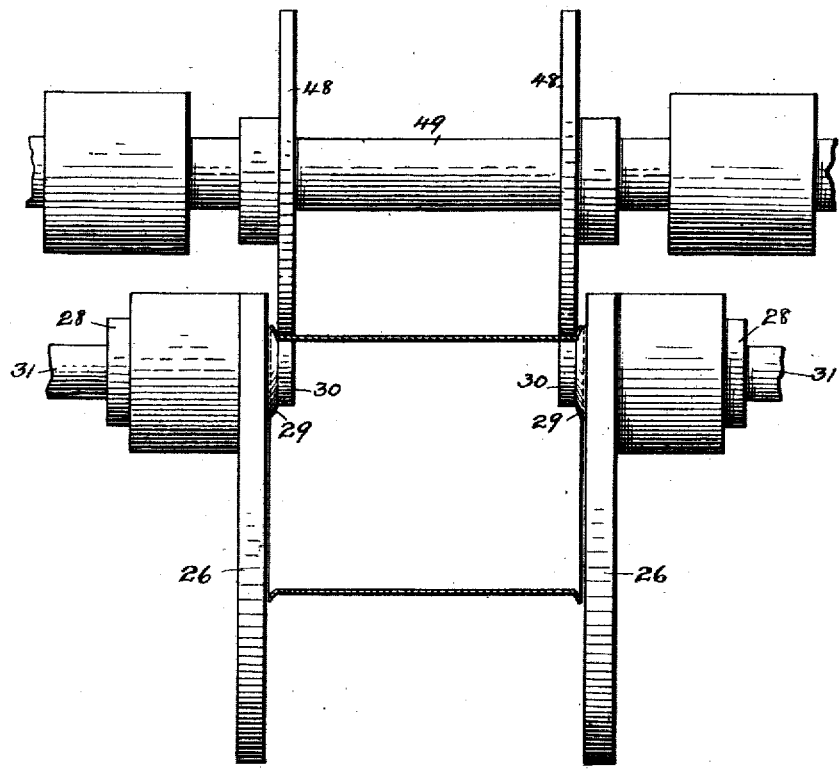
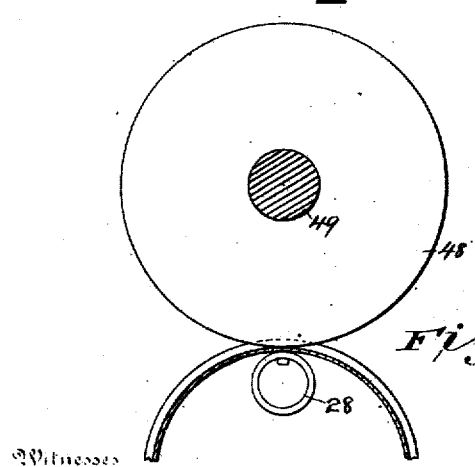
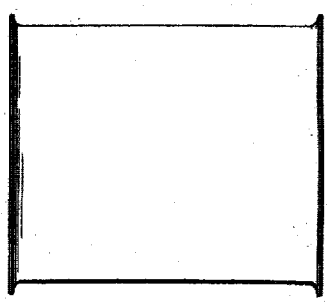

UNITED STATES PATENT OFFICE.

JULIUS BRENZINGER, OF NEW YORK, N. Y., ASSIGNOR TO THE MAX AMS MACHINE COMPANY, OF NEW YORK, N. Y., A CORPORATION OF NEW YORK.

CAN-FLANGING MACHINE.

No. 814,639.

Specification of Letters Patent.

Patented March 6, 1906.

Application filed February 11, 1903. Serial No. 142,896.

*To all whom it may concern:*

Be it known that I, JULIUS BRENZINGER, a subject of the German Emperor, residing at New York, in the county of New York and State of New York, have invented certain new and useful Improvements in Can-Flanging Machines, of which the following is a specification.

My invention relates to can-flanging machines; and its object is to provide a machine by which cans may be rapidly and automatically fed to a flanging mechanism, flanged at both ends, and automatically discharged from the machine, whereby a rapid and continuous flanging operation is obtained.

To this end my invention consists of the features and combinations hereinafter described, and pointed out in the claims.

My invention is illustrated in its preferred embodiment in the accompanying drawings; but it is obvious that the invention may be embodied in mechanisms differing in detail from those herein shown.

Figure 1:
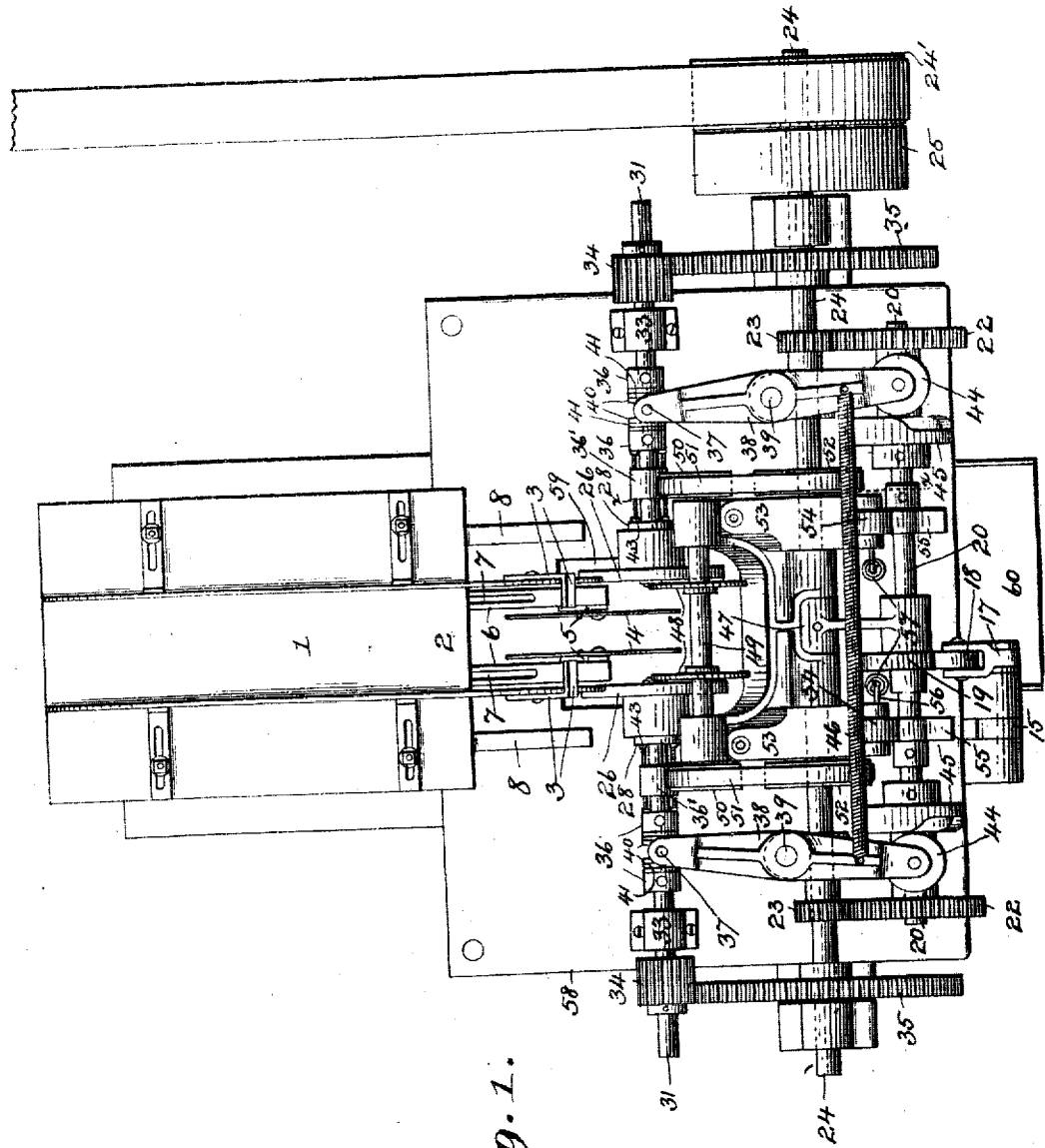
Figure 2:
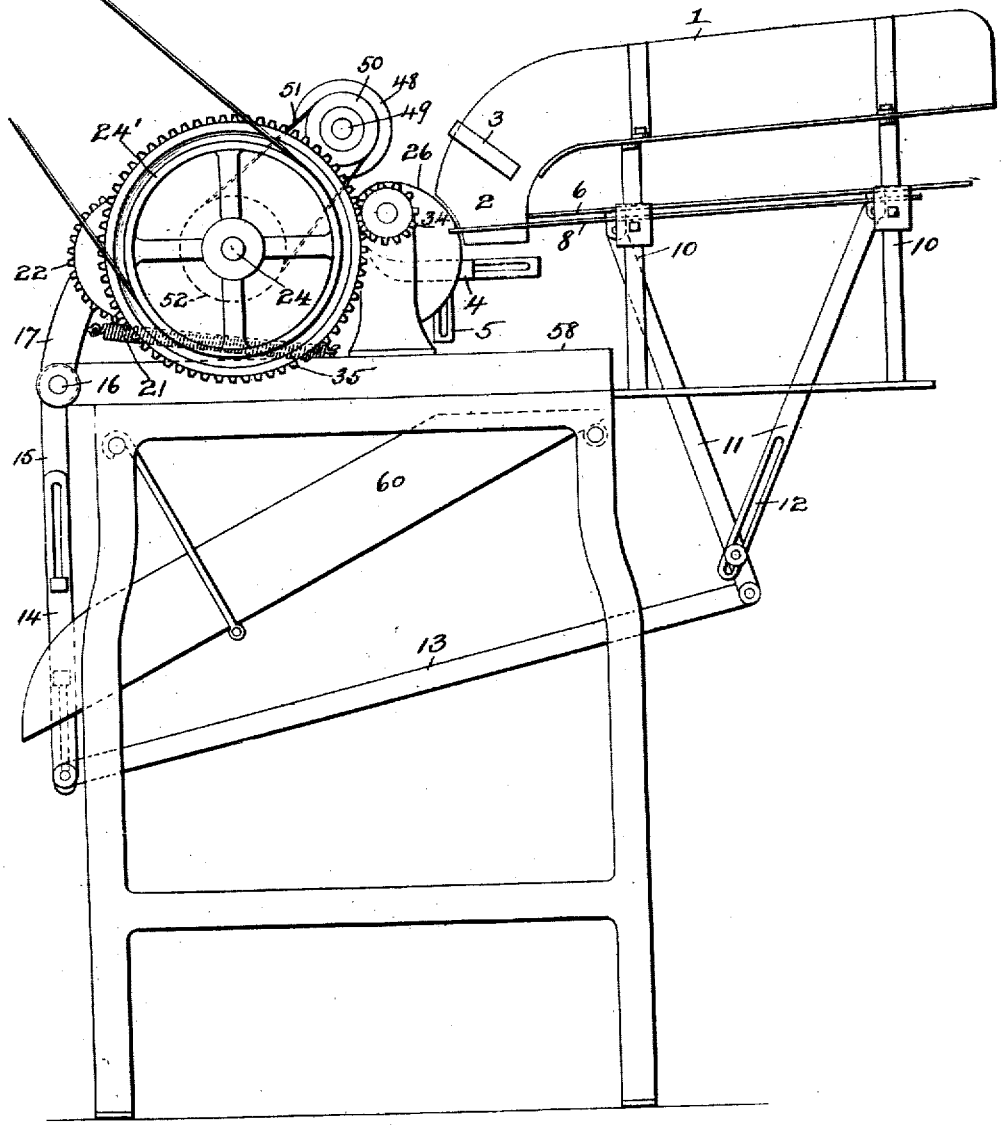
Figure 3:
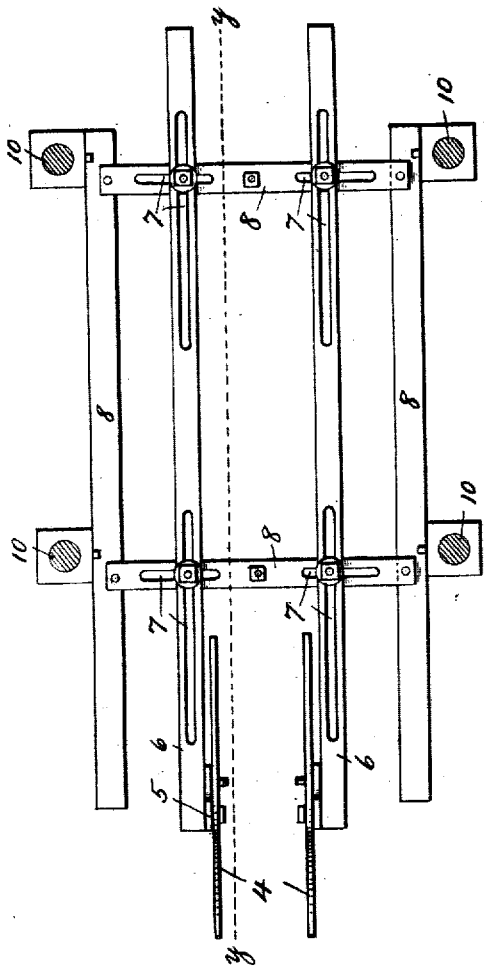
Figure 4:
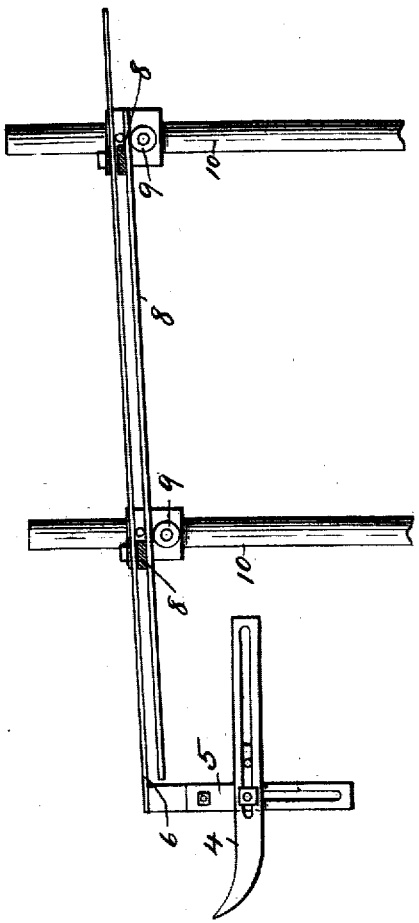

In the drawings, Figure 1 is a top plan view. Fig. 2 is a side elevation. Fig. 3 is a plan view of a can-shifting frame. Fig. 4 is a section on line $y\ y$ of Fig. 3; Fig. 5, a longitudinal side view, partly in section, of one of the flanging roller-shafts, showing the roller projected through the can-guide disk and in operative position; Fig. 6, a detail view of antierative position; Fig. 6, a detail view of antifriction-ring; Fig. 7, a section through Fig. 6; Fig. 8, a vertical section through the swinging frame of the flanging-roller and main shaft on line $x\ x$ of Fig. 1; Fig. 9, a detail side view of interior of can-guide plate; Fig. 10, a detail front elevation of flanging-rolls in operative position; Fig. 11, a sectional detail of can and rolls; Fig. 12, a detail of a flanged can.

Referring to the drawings, 1 is a can-receptacle in which the cans are placed for conveyance to the machine. In the embodiment of my invention herein set forth I have mechanisms particularly adapted for forming flanges on cylindrical can-bodies. This receptacle is provided with a downward-inclined chute portion 2, having an open bottom and stopportion 2, having an open bottom and stoplugs 3, which prevent the can from escaping from the chute as it descends the same.

Located beneath the eceptacle and at the end of the chute portion is a pair of curved can-holding fingers 4, which receive a can from the chute. These fingers are mounted, preferably adjustably both vertically and horizontally, on depending arms 5 of horizontal arms 6, adjustably mounted, by means of longitudinal and transverse slots 7, on a slidable reciprocating frame 8, adapted to slide on rollers 9, mounted in blocks fixed to pillars 10 rising from the main frame.

To the frame 8 are pivoted the ends of actuating-bars 11, one of which is slotted near its lower end and engaged in the slot numbered 12 by a screw from the other bar. This connection between the actuating-bars permits of an adjustment one upon the other for the purpose of permitting the extension of the reciprocating frame, so as to thereby accommodate different sizes of cans. To the end of one of said bars 11 is pivotally connected a long link 13, extending forward under the body of the frame and having its front end pivoted to a slide-piece 14, adjustable on the arm 15 of a bell-crank lever formed by said arm, a rocking shaft 16, journaled in the frame, and an arm 17, extending upwardly from said shaft. The arm 17 is provided at its upper end with a roller 18, bearing upon a cam 19, fixed to a shaft 20, journaled in the front part of the frame of the machine. A spring 21 is connected to said arm 17 and to a fixed part of the frame and serves to hold said roller against the cam and to assist the return movement of the arm 17 to inward position and the corresponding forward-feeding movement of the reciprocating frame 8.

The shaft 20 carries all the actuating-cams for the different mechanism. This shaft carries at its ends gears 22, which mesh with and are driven by pinions 23 on a main drivingshaft 24, journaled transversely of the machine and provided at one end with a drivingpulley 24', which may be connected to any suitable source of power, and provided also with an idle pulley 25.

The can-supporting fingers 4 of the reciprocating feed-frame extend forward between can guiding disks or plates 26, which are spaced apart a distance substantially the length of the can-body to be flanged and so as to inclose and guide the ends of said body as it is flanged. In the upper part of each disk or plate are circular holes 27, through which are adapted to be projected flanging-rolls 28. Each roll 28 has a flangeforming collar 29 and a hub 30. These rolls are mounted on the ends of rotatable and longitudinally-slidable shafts 31. These shafts are journaled and guided in disks 26 and their bearings 32 and in upright bearings 33. Near their outer ends each shaft is provided with a pinion 34, engaging a gear 35 on the main driving-shaft 24, whereby the shafts 31 are continuously rotated.

Each shaft is provided with two or more collars 36, fixed on the shaft against rotation and against sliding movement thereon. Between these collars extend studs 37 from the forked end of a rocking lever 38, pivoted on a stud 39. On each side of the studs 37 and between the same and the collars 36 are antifriction bearing-rings, all movable freely on the shaft, and the outer rings 40 being merely plain-surfaced, while the middle ring 41 is provided with antifriction bearing-balls 42, seated in countersunk recesses in the ring so as to project through on each side against the ring 40. The object of this arrangement is to permit the end rings 40 and the collars 36 to turn freely against the balls on the middle ring when either of the inside rings is pressed against by a stud 37 of the rocking lever 38, the pressure of such lever being such as to cause the inside roller to bind, so that it will not rotate, and the friction that would otherwise result from this binding action is overcome by the ball-bearings, which permit the outer ring and collar to rotate freely.

Between the inner one of the collars 36 and the roll 28 is an adjustable spacing and adjusting collar 36', fixed on the shaft 31 against rotation and longitudinal movement thereon, but capable of removal therefrom. This collar is provided with adjusting contact-screws 43, projecting from the ends of the collar and having their heads bearing against collar 36 at one side and against roll 28 at the other side. By these means the extent of projection of the roll 28 into the flanging-space between the can-guide disk may be conveniently adjusted.

The front arms of the rocking-lever 38 are provided with rollers 44, which bear against actuating-cams 45, fixed on the shaft 20. A coiled return-spring 46 connects the front ends of the arms of the levers. By means of these cams and the spring 46 the levers are rocked in and out horizontally to carry the rolls 28 and their shaft 31 inward into position to support and flange the can-body and to carry them back into retracted position to release said can-body.

Carried by a rocking frame 47, mounted freely and rotatably on the main shaft 24, are two male flanging-rollers 48. These rolls are fixed on a rotating shaft 49, journaled in the rocking frame. The shaft is provided at each end with a pulley 50, driven by a belt 51, running over pulley 52 on the main driving-shaft 24. From the rocking frame 47 extend arms 53, provided with rollers 54, which bear against cams 55, fixed on the shaft 20. By this connection the frame is rocked forward and the rolls 48 thrown down into position to coöperate with the rolls 28 to flange the ends of the can-body. Between the frame and arm 53 is placed a yielding buffer 53' to permit the rolls to yield to seams of any unevenness in the can. Connecting at their upper ends to pins 56, extending from arms 53 of the rocking frame, are springs 57, which serve to return said rocking frame to its raised position after its actuation by the cams. The table 58 of the frame is provided with a discharge-opening 59, and below the table is a discharge-chute 60.

The cans to be flanged are placed in the receptacle and are fed forward until the can in front falls down the chute 2 and rests upon the arms 6, connected to the reciprocating frame 8. The can-body is held from falling forward out of the chute by the stop-lugs 3. The main shaft 24, being continuously driven it will drive, through gears 22 23, the cam-shaft 20, and thereupon the spring 21, and the cam 19 will actuate the drive 15 of the rocking bell-crank lever, so as to throw backward the reciprocating frame 8 through bars 11 and link 13. This withdrawal of the frame will allow the can-body to fall upon the curved supported fingers 4. The continued movement of the main shaft then causes cam 19 to force the frame-controlling lever outward, so as to carry forward the sliding frame 8 and project the finger 4 between the can-guide disks 26, whereby the edges of the can-body will be carried over and cover the holes 27, through which the rods 28 are adapted to slide. Simultaneously with the transference of the can-body to the flanging-space the rolls 28 are being advanced longitudinally by the operation of the laterally-rocking levers 38, which are actuated by their cams 45. As soon as the cans have been projected forward enough to cover the holes 27 the rolls 28 will be slid out far enough to extend into and support the can-body. The fingers 4 then withdraw, and another can drops down upon the same, and the first can hangs upon the collars 29 of the projecting rolls. At the same time the complementary rolls 48 rock down on their frame 47 to coöperate with the flanging-rolls 28. The peripheral edge of each roller 48 is adapted to fit on the hub 30 of roll 28 and its side to press against the side of the collar 29. Consequently when the upper rolls 48 are pressed down upon the can-body they will force the body on the hub, bending up its edges into flanges against the collar 29. Both pairs of rolls are continuously rotated, and hence the can-body being gripped by the rolls of the opposite pairs it will be rotated thereby several revolutions, so as to form the annular flange. The flange having been completed, the upper rolls 48 are withdrawn by the rocking of its frame and rolls 28 by the rocking cam-controlled levers 38, whereupon the can will fall into the discharge-chute 60.

It is clear that various changes in the details of the machine may be made without departing from the principle of my invention.

Having thus described my invention, what I claim is—

1. A can-flanging machine having a pair of opposite, similar, longitudinally-slidable and rotatable flanging-rolls, fixed supports in which said rolls are adapted to slide, means to feed a can automatically to a position to inclose the circumferences of said rolls, means to project said rolls within said can, said rolls adapted to form the sole support for the can during flanging, complementary bearing-surfaces for said can, and means to withdraw said rolls to permit the automatic discharge of a can, substantially as described.

2. A can-flanging machine having a can-feed chute, fixed guide-plates adapted to inclose a can-body and of a distance apart to guide the ends of said body, and opposite rotatable flanging-rolls slidable through said guide-plates and adapted to receive and support the can-body, complementary bearing-surfaces, and means to withdraw said rolls whereby the can-body is automatically discharged, substantially as described.

3. A can-flanging machine having a rotatable and longitudinally-slidable flanging-roll, a complementary roll and a swinging frame on which said latter roll is mounted, means to automatically deliver the can over the circumferential extension of the slidable roll, whereby it is supported by said roll when the delivering means are withdrawn, substantially as described.

4. A flanging-machine having a pair of longitudinally-slidable flanging-rolls, can-guide plates, means to feed a can to the space between said plates, means to project said slidable rolls through said plates to receive and support said cans in combination with a pair of complementary rotatable rolls, a swinging frame on which said rolls are mounted, and means to successively swing said latter rolls into position to coöperate with the first rolls and means to successively withdraw the swinging rolls, and the slidable rolls, whereby the can is automatically dropped from the machine through said space between the guides, substantially as described.

5. A can-flanging machine, a swinging frame, arms carried by and movable with said frame, yielding buffer means between said arms and frame, and flanging-rolls, carried by said arms and a cam for rocking said frame to bring said rolls into flanging position and positively hold them in such position, substantially as described.

6. A can-flanging machine having opposite flanging-rolls, longitudinally-movable shafts for said rolls and having a can-feeding mechanism comprising a reciprocating frame movable at right angles to said shafts having can-body-supporting means adapted to carry a can to the space between said rolls, substantially as described.

7. A can-flanging machine having a reciprocating feeding-frame having can-body-supporting means and provided with means to adjust it longitudinally, consisting of longitudinal slots formed in said frame, horizontal arms secured in said slots, can-holding fingers carried by said arms, substantially as described.

8. A can-flanging machine having a reciprocating feeding-frame which has can-body-supporting means and provided with means to adjust said frame laterally consisting of lateral slots in the frame, arms adjustably secured therein and can-holding fingers carried by said arms, substantially as described.

9. A can-flanging machine having a reciprocating feeding-frame having an upper can-stopping part and can-receiving fingers below said upper part and extending in the same direction, a flanging mechanism, guide-plates between which the can is held to flange the same, said fingers extending between said guide-plates, substantially as described.

10. A can-flanging machine provided with an inclined chute, a stop at the forward part thereof, a reciprocating frame below said chute, said frame having an upper part, consisting of parallel horizontal arms, and lower parallel fingers extending beyond the end of the upper part, substantially as described.

11. A can-flanging machine having a flanging mechanism which supports the can said mechanism consisting of longitudinally-movable rolls, movable into opposite ends of the can, guide-plates having plane faces through which said rolls pass, and means for withdrawing the flanging mechanism from the support of the can, and a discharge-chute below said guide-plates whereby the can is permitted to be discharged from the machine, substantially as described.

12. A can-flanging machine having a mechanism for flanging both ends of a can simultaneously, means for supporting said can solely by the flanging mechanism, means, for feeding said can into position to be engaged by the flanging mechanism, means to move said flanging mechanism into supporting position and means to withdraw said flanging mechanisms to permit the discharge of the can from the machine, substantially as described.

In testimony whereof I have signed my name to this specification in presence of two witnesses.

JULIUS BRENZINGER.

Witnesses:
H. P. DOOLITTLE,
JAS. H. BLACKWOOD